United States Patent
Marshall et al.

(10) Patent No.: US 9,003,215 B2
(45) Date of Patent: *Apr. 7, 2015

(54) POWER-AWARE THREAD SCHEDULING AND DYNAMIC USE OF PROCESSORS

(75) Inventors: Allen Marshall, Woodinville, WA (US); Andrew J. Ritz, Sammamish, WA (US); Yimin Deng, Sammamish, WA (US); Nicholas S. Judge, Bellevue, WA (US); Arun U. Kishan, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 305 days.

This patent is subject to a terminal disclaimer.

(21) Appl. No.: 13/214,545

(22) Filed: Aug. 22, 2011

(65) Prior Publication Data
US 2011/0307730 A1    Dec. 15, 2011

Related U.S. Application Data

(63) Continuation of application No. 12/057,716, filed on Mar. 28, 2008, now Pat. No. 8,010,822.

(51) Int. Cl.
*G06F 1/32* (2006.01)
*G06F 9/50* (2006.01)

(52) U.S. Cl.
CPC ............ *G06F 1/3203* (2013.01); *G06F 9/5033* (2013.01); *G06F 9/5094* (2013.01); *Y02B 60/144* (2013.01); *G06F 1/329* (2013.01); *Y02B 60/142* (2013.01); *Y02B 60/1278* (2013.01); (Continued)

(58) Field of Classification Search
USPC ........................... 713/320, 323, 324; 718/105
See application file for complete search history.

(56) References Cited

U.S. PATENT DOCUMENTS

| | | |
|---|---|---|
| 6,901,522 B2 | 5/2005 | Buch |
| 7,093,147 B2 | 8/2006 | Farkas et al. |
| 7,111,182 B2 | 9/2006 | Gary |

(Continued)

FOREIGN PATENT DOCUMENTS

| | | |
|---|---|---|
| JP | 9185589 | 7/1997 |
| JP | 2000112585 | 4/2000 |

(Continued)

OTHER PUBLICATIONS

Chinese Office Action mailed Jan. 18, 2013 for Chinese patent application No. 200980112179.7, a counterpart foreign application of US patent No. 8,010,822, 10 pages.

(Continued)

*Primary Examiner* — Thuan Du
(74) *Attorney, Agent, or Firm* — John Jardine; Kate Drakos; Micky Minhas

(57) ABSTRACT

Techniques and apparatuses for providing power-aware thread scheduling and dynamic use of processors are disclosed. In some aspects, a multi-core system is monitored to determine core activity. The core activity may be compared to a power policy that balances a power savings plan with a performance plan. One or more of the cores may be parked in response to the comparison to reduce power consumption by the multi-core system. In additional aspects, the power-aware scheduling may be performed during a predetermined interval to dynamically park or unpark cores. Further aspects include adjusting the power state of unparked cores in response to the comparison of the core activity and power policy.

20 Claims, 7 Drawing Sheets

(52) U.S. Cl.
CPC .............. *Y02B 60/32* (2013.01); *G06F 1/3287*
(2013.01); *Y02B 60/1282* (2013.01)

(56) References Cited

U.S. PATENT DOCUMENTS

| | | |
|---|---|---|
| 7,137,117 B2 | 11/2006 | Ginsberg |
| 7,174,467 B1 | 2/2007 | Helms et al. |
| 7,315,952 B2 | 1/2008 | Wilcox et al. |
| 7,318,164 B2 | 1/2008 | Rawson, III |
| 7,437,581 B2 | 10/2008 | Grochowski et al. |
| 7,900,069 B2 * | 3/2011 | Allarey ............... 713/320 |
| 7,962,770 B2 * | 6/2011 | Capps et al. .......... 713/300 |
| 7,966,506 B2 * | 6/2011 | Bodas et al. .......... 713/323 |
| 7,992,151 B2 * | 8/2011 | Warrier et al. ........ 718/104 |
| 2005/0050373 A1 | 3/2005 | Orenstien et al. |
| 2005/0273635 A1 | 12/2005 | Wilcox et al. |
| 2006/0004988 A1 | 1/2006 | Jordan |
| 2006/0090161 A1 | 4/2006 | Bodas et al. |
| 2006/0123251 A1 | 6/2006 | Nakajima et al. |
| 2006/0149975 A1 | 7/2006 | Rotem et al. |
| 2006/0212677 A1 | 9/2006 | Fossum |
| 2007/0204268 A1 | 8/2007 | Drepper |
| 2007/0220289 A1 | 9/2007 | Holle et al. |
| 2007/0234088 A1 | 10/2007 | Marshall et al. |
| 2009/0249094 A1 | 10/2009 | Marshall et al. |

FOREIGN PATENT DOCUMENTS

| | | |
|---|---|---|
| JP | 2006302059 | 11/2006 |
| JP | 200937335 | 2/2009 |
| RU | 2171490 | 7/2001 |
| TW | 200809469 | 2/2008 |

OTHER PUBLICATIONS

Russian Office Action mailed Dec. 11, 2012 for Russian patent application No. 2010139638, a counterpart foreign application of US patent No. 8,010,822, 4 pages.
Japanese Office Action mailed Mar. 28, 2012 for Japanese patent application No. 2011-501858, a counterpart foreign application of US patent No. 8,010,822, 3 pages.
Chinese Office Action mailed Apr. 27, 2012 for Chinese patent application No. 200980112179.7, a counterpart foreign application of US patent No. 8,010,822, 12 pages.
Isci et al., "An Analysis of Efficient Multi-Core Global Power Management Policies: Maximizing Performance for a Given Power Budget", 39th Annual IEEE/ACM Intl Symposium on Microarchitecture, 2006, 12 pgs.
Kumar et al., "Processor Power Reduction via Single-ISA Heterogeneous Multi-Core Architectures", Computer Architecture Letters, Apr. 2003, 4 pgs.
Pallipadi et al., "Processor Power Management features and Process Scheduler: Do we need to tie them together?", Intel Open Source Technology Center, 2007, pp. 1-8.
Chinese Office Action mailed Apr. 15, 2013 for Chinese patent application No. 2009801121791, a counterpart foreign application of US patent No. 8,010,822, 7 pages.
PCT Search Report for PCT Application No. PCT/US2009/034209, mailed Sep. 1, 2009 (10 pages).
"Search Report Issued in Taiwan Patent Application No. 98105020", Dated: Feb. 6, 2014, Filed Date: Feb. 17, 2009, 1 Page.

* cited by examiner

POWER-AWARE THREAD SCHEDULING AND DYNAMIC USE OF PROCESSORS

RELATED APPLICATIONS

The present application is a continuation of U.S. patent application Ser. No. 12/057,716 (currently referenced as U.S. Patent Publication No. 2009/0249094), filed on Mar. 28, 2008, which is hereby incorporated by reference in its entirety.

BACKGROUND

Computer system management of power consumption is important to extend the operational ability of a battery and to reduce overall power consumption, which can be both fiscally and environmentally beneficial. Even for non-mobile computers, reducing power requirements is beneficial to save important global resources and prolong operation when relying on a battery backup system, such as during a utility power interruption.

Although most components of a computing system use power during system operation, the processor uses a disproportionate share of the system power. Many computer systems, including consumer based systems, include multiple processors and/or processors with multiple cores. Multiple processors enable the computers to execute increasing levels of work in parallel however additional processors may also increase power consumption. Most modern processors feature very low power idle power states, which may be applied per-core on a multi-core system, and which may be controlled by an operating system. In addition, processor frequency may be scaled on a per-core or per core group basis to reduce power usage by the system.

SUMMARY

This summary is provided to introduce simplified concepts of providing power-aware thread scheduling and dynamic use of processors, which is further described below in the Detailed Description. This summary is not intended to identify essential features of the claimed subject matter, nor is it intended for use in determining the scope of the claimed subject matter.

Exemplary techniques and apparatuses for providing power-aware thread scheduling and dynamic use of processors are disclosed. According to one or more embodiments, a multi-core system is monitored to determine core activity. A power policy is retrieved to initiate a performance and power savings plan for the cores. One or more of the cores of the multi-core system are parked (placed into a system-specified low power state) based on the power policy and core activity. When one or more cores are parked, the unparked cores are left to handle all of the remaining system activity. In some embodiments, the power policy may be modified to include additional factors influencing power savings or system performance. In at least one other embodiment, the multi-core system may dynamically adjust a power state of one or more unparked cores in addition to parking the one or more cores.

BRIEF DESCRIPTION OF THE DRAWINGS

The detailed description is described with reference to the accompanying figures. In the figures, the left-most digit(s) of a reference number identifies the figure in which the reference number first appears. The same reference number in different figures refers to similar or identical items.

FIG. 3B shows an illustrative revision of the core utilizations in response to an illustrative system core utilization as shown in FIG. 3A.

DETAILED DESCRIPTION

Processors may enable low power idle power states, including an idle state that consumes no power (zero watts). An operating system may direct one or more processors (or simply "cores") to an idle power state (i.e., processor sleep state) when there is no useful work to perform. Maximizing time spent in these low power states may increase system energy efficiency and/or extend battery performance. In addition to these processor idle power states, processors may also provide controls for scaling the processor's frequency, either alone or in conjunction with a simultaneous reduction in processor core voltage. These controls can be collectively referred to as processor power management (PPM) features.

Processors may facilitate the execution of billions of executions per second. While having such a high capacity for executing computer instructions, processors may have considerable variance in workload over short periods of time. For example, periods as short as a delay between a typist's keystrokes may enable the PPM to reduce processor power momentarily or even enter a brief sleep state. Although a fraction of a second of power may seem negligible, over longer periods of time the cumulative power savings may be significant.

Therefore, the PPM may reduce power demands by directing unused processors to a low power state or a sleep state ("parked" state) when the processors do not have adequate workload to justify higher power states. Parked cores may be placed in a processor idle power state (ACPI C-state) using a minimal amount of power or no power at all. The active work to be done on the system will be time multi-plexed on the unparked processors.

Accordingly, techniques and apparatuses to facilitate providing power-aware thread scheduling and dynamic use of processors are disclosed herein in the various sections that follow.

Illustrative Environment

Figure 1:
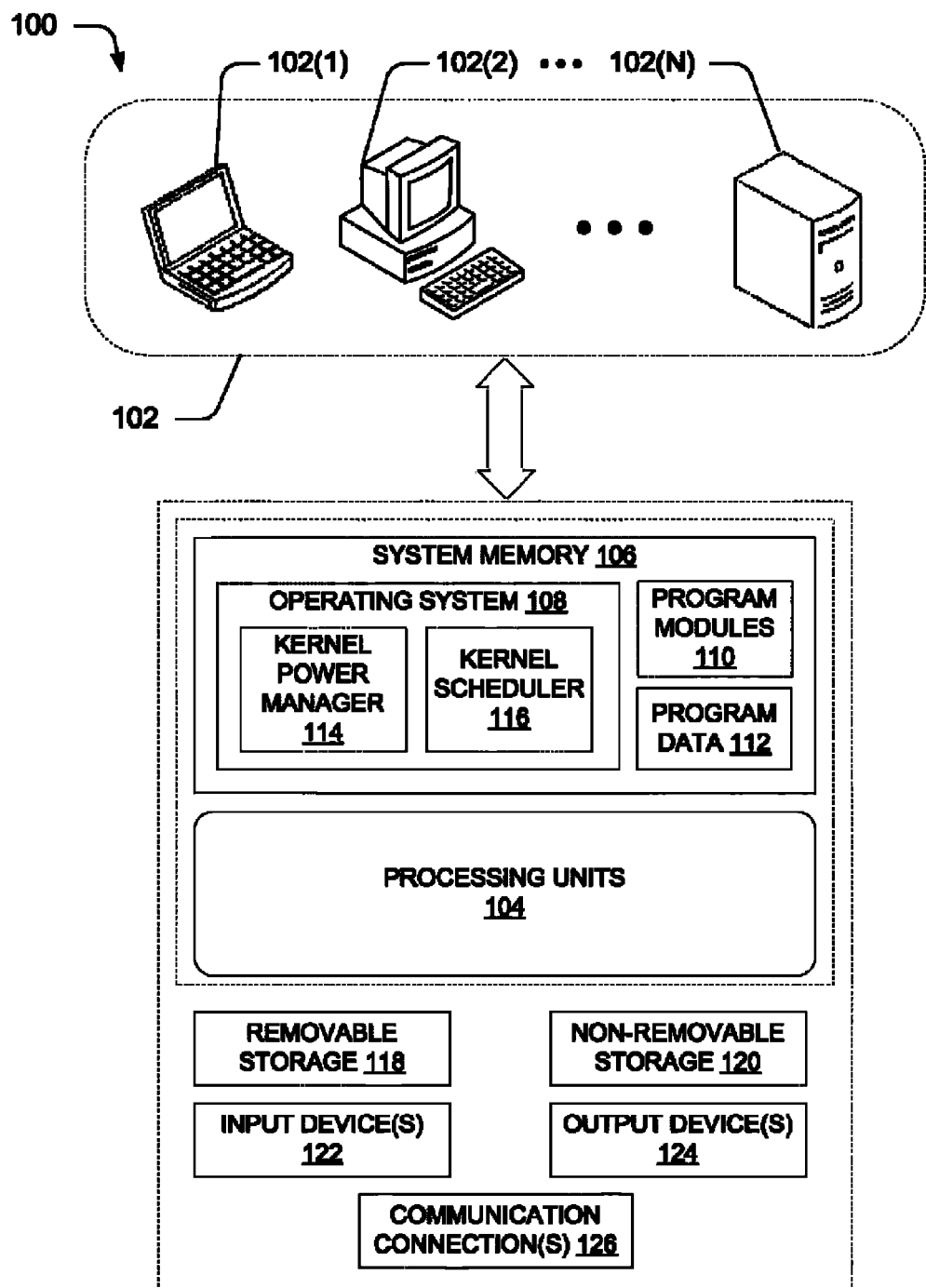
FIG. 1 is an illustrative system that may be used to implement at least one embodiment of power-aware thread scheduling and dynamic use of processors.

FIG. 1 is an illustrative system 100 that may be used to implement at least one embodiment of power-aware thread scheduling and dynamic use of processors. The system 100 includes a computing device 102. For example, the computing device may be a mobile computer 102(1), a desktop computer 102(2), and/or a server 102(N), among other possible computing devices. In a very basic configuration, computing device 102 typically includes one or more processors ("processors") 104. For example, the processors 104 may be at least one of multiple independent processors configured in parallel or in series and a multi-core processing unit, either singly or in various combinations. A multi-core processor may have two or more processors ("cores") included on the same chip or integrated circuit. The terms "processor," "core," and "logical processor" may be used interchangeable throughout this disclosure unless specifically stated otherwise with reference to a particular element.

In addition, the computing device 102 includes system memory 106. Depending on the exact configuration and type of computing device, system memory 106 may be volatile (such as RAM), non-volatile (such as ROM, flash memory, etc.) or some combination of the two. System memory 106 typically includes an operating system 108, one or more program modules 110, and may include program data 112.

The operating system 108 may include a kernel power manager 114 that is responsible for directing the use of processor power management (PPM) features. The kernel power manager 114 may adjust the performance (e.g., speed) of the processors 104 using a performance state (p-state) or linear throttle state (t-state). For example, the kernel power manager 114 may balance a power consumption of the processors 104 with a current workload to conserve energy when possible. Additionally or alternatively, the kernel power manager 114 may enable the processors 104 to provide a maximum processing capacity in response to a workload demand. Further, the kernel power manager 114 may direct one or more of the processors 104 into a low power sleep state when no active threads are ready to run, such as threads of the program module 110.

The operating system 108 may provide modules for queuing, scheduling, prioritizing, and dispatching units of work (threads) across all available processors 104 in the system 100, which may be represented as a collection of modules collectively referred to as a kernel thread scheduler 116. When an active thread is ready to be run, the kernel scheduler 116, via one or more modules, dispatches the thread to any available core for processing.

Generally speaking, the kernel power manager 114 and kernel scheduler 116 have competing interests in control and operation of the processors 104. The kernel power manager is configured to minimize the power consumption of the processors 104, and therefore tries to reduce the frequency and/or power state of one or more of the processors 104. Conversely, the kernel scheduler 116 is configured to maximize processing throughput, and thus favors distributing work to all processors 104.

The computing device 102 may have additional features or functionality. For example, the computing device 102 may also include additional data storage devices (removable and/or non-removable) such as, for example, magnetic disks, optical disks, or tape. Such additional storage is illustrated in FIG. 1 by a removable storage 118 and a non-removable storage 120. The computer storage media may include volatile and nonvolatile, removable and non-removable media implemented in any method or technology for storage of information, such as computer readable instructions, data structures, program modules, or other data. The system memory 106, the removable storage 118, and the non-removable storage 120 are all examples of the computer storage media. Thus, the computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by the computing device 102. Any such computer storage media may be part of the computer device 102.

The computing device 102 may also have one or more input device 122 such as keyboard, mouse, pen, voice input device, touch input device, etc. One or more output device 124 such as a display, speakers, printer, etc. may also be included either directly or via a connection to the computing device 102.

The computing device 100 may also include a communication connection 126 that allows the device to communicate with other computing devices, such as over a network. The communication connection 126 is one example of communication media. The communication media may typically be embodied by computer readable instructions, data structures, or program modules. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The computer readable media can be any available media that can be accessed by the computing device 102. By way of example, and not limitation, the computer readable media may comprise the "computer storage media" and the "communications media."

Various modules and techniques may be described herein in the general context of computer-executable instructions, such as program modules, executed by one or more computers or other devices. Generally, program modules include routines, programs, objects, components, data structures, etc. for performing particular tasks or implement particular abstract data types. These program modules and the like may be executed as native code or may be downloaded and executed, such as in a virtual machine or other just-in-time compilation execution environment. Typically, the functionality of the program modules may be combined or distributed as desired in various embodiments. An implementation of these modules and techniques may be stored on or transmitted across some form of the computer readable media.

Illustrative Processor Configuration

Figure 2:
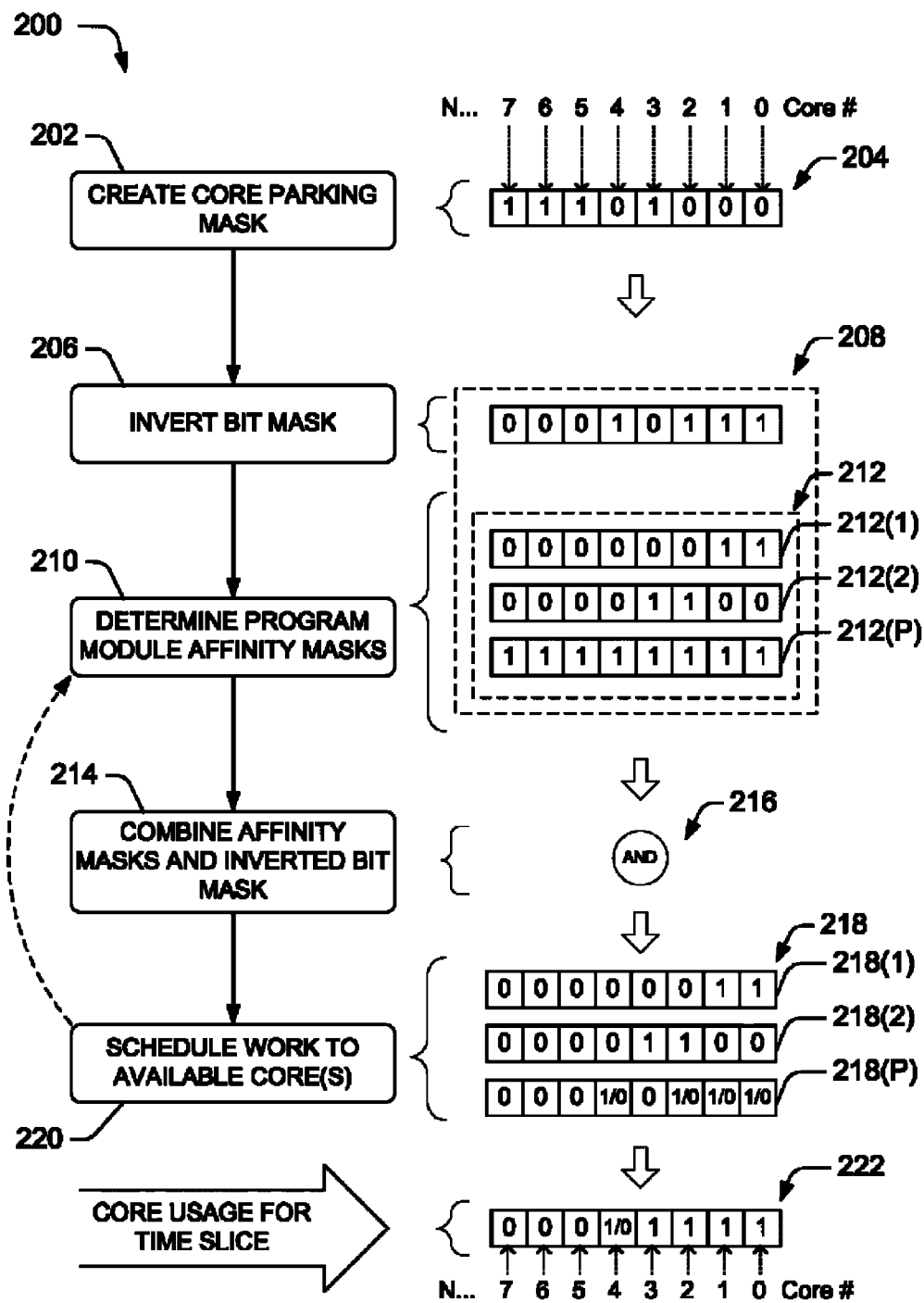
FIG. 2 shows a flow diagram of at least one embodiment of a process of creating a core parking mask and implementing the mask with a thread scheduler to enable allocation of work to processors.

FIG. 2 shows a flow diagram of at least one embodiment of a process 200 of creating a core parking mask and implementing the mask with the thread scheduler to enable allocation of work to processors. The process 200 is illustrated as a collection of blocks in a logical flow graph, which represent a sequence of operations that can be implemented in hardware, software, or a combination thereof. In the context of software, the blocks represent computer-executable instructions that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described blocks can be combined in any order and/or in parallel to implement the process. Other processes described through this disclosure, in addition to process 200, shall be interpreted accordingly. For discussion purposes, the process 200 is described with reference to the system 100 of FIG. 1.

As shown in FIG. 2, a core parking mask is created in the system memory at 202. For example, the kernel power manager 114 may create the core parking mask at 202, which resides in the operating system 108. An illustrative core parking mask ("bit mask" or simply "mask") 204 may provide a cell representing a corresponding core. As shown in FIG. 2, the illustrative system includes eight cores, however more or fewer cores may be used. The bit mask 204 includes a bit value in each cell, where "1" represents a parked core and "0" represents an unparked core. A parked core is a core that is placed into a low power sleep state. In some embodiments, a parked core has no power consumption, thus uses zero watts. In some embodiments, cores have dependencies such as shared hardware circuitry. If both cores can be put into a low power state, dependencies can also be implicitly placed into a low power state. Thus a core parking mask can be selected which will maximize power savings compared to another mask. For example, turning off all cores in a single processor socket might save more power than turning off half the cores in two processor sockets. The bit mask 204 includes four parked cores, numbered (right to left, zero to seven): 3, 5, 6, and 7. It follows that cores 0, 1, 2, and 4 are unparked cores.

In accordance with one or more embodiments, the bit mask 204 may be inverted at 206 to create the inverted bit mask 208. For example, the kernel power manager 114 may create the inverted bit mask 208. The inverted bit mask includes an inverted bit value for each cell (i.e., core). Accordingly, cores designated with a "1" may be preferred to process data while cores designated with a "0" may not be preferred to process application threads.

At 210, an application schedule is determined, such as by the kernel scheduler 116. For example, the computing device 102 may be running one or more of the program modules 110. Some of the program modules 110 may include single threaded programs while other program modules may include multi-threaded modules. Typically, the kernel scheduler 116 schedules each thread to an available core, based on a number of factors such as priority, core availability, affinity (scheduling restrictions), and other factors. When the threads outnumber the available cores, then the kernel scheduler 116 alternates threads or otherwise schedules threads to ensure that the threads eventually make progress (i.e., are executed by the processor). The processors 104 may alternate threads on a single core many times per second, thus providing opportunities for the kernel scheduler 116 to effectively schedule threads to available cores.

While many program modules do not assign threads to specific processors, some complex program modules may require a thread to be executed by a specific processor, referred to as setting the thread's processor affinity. Program module thread affinity masks 212 represent the cores requested for processing the threads, as determined by the program modules 110. For example, a first program module may have a first affinity mask 212(1) which indicates that threads must be scheduled by the kernel scheduler 116 on cores 0 and 1. A second affinity mask 212(2) associated with a second program module may indicate that threads may be scheduled on cores 2 and 3 while another program module may include an affinity mask 212(P) indicating that threads can be scheduled on any of the available cores (all cores are shown as selected). It should be noted that the affinity mask 212(P) is a special case in that it effectively includes no constraints for allocation of threads on the cores.

In some embodiments, at 214 the program module affinity masks 212 are combined, one at a time, with the inverted bit mask 208 using an "AND" operator 216 to determine the set of eligible processors for an available processor set 218. At 220, the first affinity mask 212(1) is used to create a first available processor set 218(1). The process 200 may include an iterative process of operations 210, 214, and 220 for each program module (i.e., for each combination of the inverted bit mask 208 and the affinity mask 212). Thus, the second affinity mask 212(2) is used to create a second available processor set 218(2) during a second iteration of the operations 210, 214, and 220, and so forth.

As discussed above, the bit values for each core (e.g., core 0, . . . , core 7) are used to determine the available processor set 218 for scheduling threads. The "AND" operator 216 returns a core bit value of "1" where both of the operands (i.e., combined bit values for a core) include a "1" representing a thread affinitized to a specific core. For example, when the first affinity mask 212(1) is combined with the inverted bit mask 208, cores 0 and 1 both are active cores and will return a core bit value of "1" while the remaining cores 2-7 include a core bit value of "0," as illustratively shown in the first available processor set 218(1).

The second affinity mask 212(2) includes a core value of "1" at core 3, while the inverted bit mask 208 indicates core 3 is parked. The kernel scheduler 116 may choose to override the inverted bit mask to accommodate the second affinity mask 212(2), which is represented in the second available processor set 218(2) where core 3 includes a core value of "1," therefore shifting work to a core designated as parked in the inverted bit mask 208 (which may be subsequently unparked). In some embodiments, the thread may be scheduled using any number of heuristics. An optimal core in the thread's affinity may be used while ignoring the inverted bit mask 208. If the optimal core is parked, a fallback may include selecting a processor in the same NUMA (non-uniform memory access) node as the preferred core. The scheduler treats the core parking inverted mask as a hint of preferred locations to run the thread, but it will choose amongst the hard limitation (the hard affinity) of what it believes to be the most performant option.

Where all cores are designated as available, such as in the affinity mask 212(P), the bit value may be ignored because the program module is indicated that it allows the threads to be executed by any core. The affinity mask 212(P) may include scheduled cores at any of the cores indicated by the inverted bit mask 208, such as cores 0, 1, 2, and 4, as represented by the available processor set 218(P) by core values showing "1/0" (either "1" or "0", while at least one core must have a core value of "1" to enable scheduling the work of the affinity mask 212(P)). In some embodiments, the available processor set 218(P) may select cores that are unparked and idle when determining an allocation of work to available cores. Ideally, work shifting may allocate work to cores 0, 1, 2, and 3, thus leaving core 4 unused and possibly parked in a subsequent action. Other considerations, as discussed below, may determine which cores are allocated work in response to the affinity mask 212(P) to create a preferred location. For example, a preferred location may be based on factors such as optional memory access performance.

The operations 210, 214, and 220 may be used to schedule threads, as described above with reference to FIG. 2. In addition, other work may be performed in the process 200 by the operations 210, 214, and 220 such as a deferred procedure call (DPC), timers, processing interrupts, or other processor work.

In accordance with one or more embodiments, FIG. 2 illustrates an example core usage 222 for a time slice. For example, a combination of the cores that are active from the available processor set 218 may result in the core usage 222 during a given time check interval, such as without limitations 100 milliseconds. The core 4 in the core usage 222 may or may not indicated as used depending on whether work is scheduled to core 4 in the available processor set 218(P), as discussed above. From the perspective of the kernel power manager 114, the core usage 222 will ideally include a core value of "0" for core 4, thus minimizing the number of unparked cores and resulting in a reduction of power consumption. Regardless of the core usage 222, a new core parking mask may be created for the next time slice, which may use information from the core usage 222 to determine the new core parking mask. In some instances, core 3 may not be required because core 2 may have enough processing utilization to satisfy the second affinity mask 212(2) and is still an unparked core.

Figure 3A:
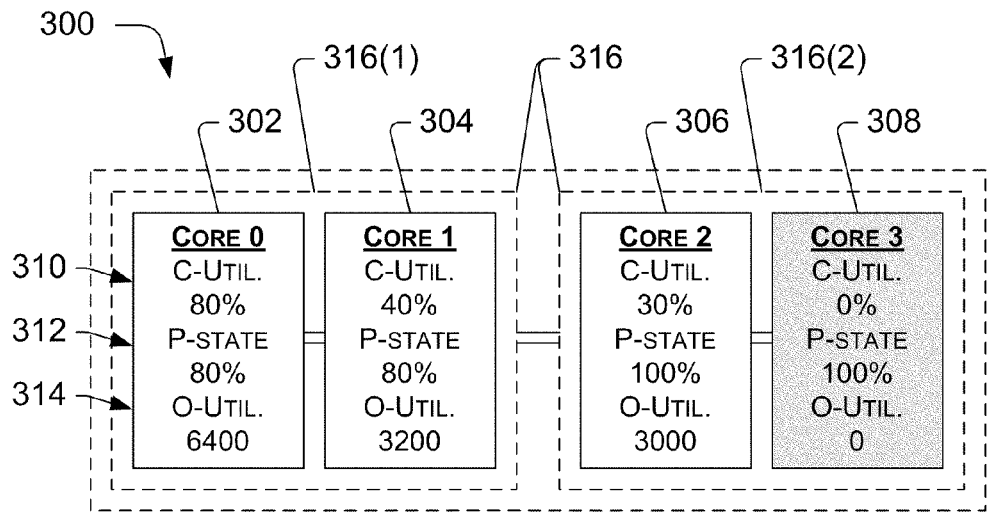
FIGS. 3A and 3B show illustrative core utilizations in accordance with at least one embodiment of the disclosure. More specifically.
Figure 3B:
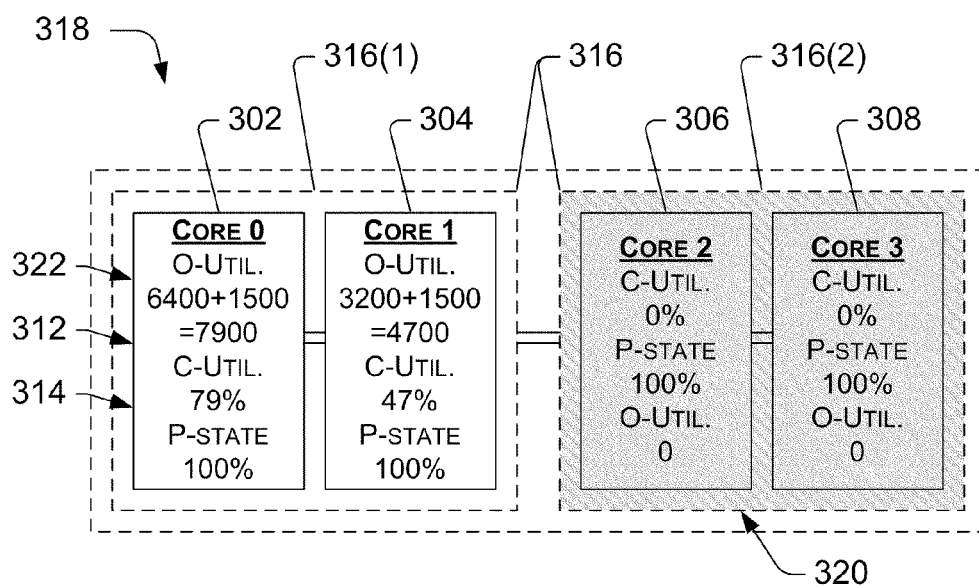

FIGS. 3A and 3B show illustrative core utilizations in accordance with at least one embodiment of the disclosure. More specifically, FIG. 3B shows an illustrative revision of the core utilizations in response to an illustrative system core utilization as shown in FIG. 3A.

In accordance with one or more embodiments, FIG. 3A shows a system 300 including a number of cores 302, 304, 306, and 308, although more or fewer cores may be included in alternative embodiments of the system 300. The kernel power manager 114 may control the cores using a power policy. The power policy may determine the number of active cores, and influence how the kernel power manager 114 may calculate the set of available cores. The power policy may be used to restrict the number of available cores, or to allow the kernel power manager 114 to scale the number of available cores. The number of cores supported by a platform may vary across different systems, thus a flexible scheme is necessary to allow the number of cores to be specified by the kernel power manager without knowing in advance how many cores are available. Therefore, in some embodiments, the number of cores to be used may be expressed as a percentage of maximum core utilization. Accordingly, an implementation of the cores may require rounding up the percentage to the next available number that represents the number of cores. For example, the core usage percent may be calculated as 60 percent. If the system includes four cores, the percent may be rounded up to 75% and three cores will be unparked while one core is parked.

Each core includes a core utilization ("core utility") 310 that represents the workload of that core, expressed as the percentage of a core's run time out of the total time, independent of the core's performance state. For example, the core 0 302 may have a core utility of 80% indicating that the core is doing 20% less work than the workload maximum capacity of core "0." Accordingly, a core utility of 100% represents a core working a maximum capacity while a core having a 0% core utility represents an unused core. In some embodiments, the kernel power manager 114 may monitor the core utility 310.

In addition, each core may include a performance state (advanced configuration and power interface (ACPI) p-state) 312. The p-state 312 is a core frequency and voltage setting and is controlled by the kernel power manager 114. The p-state 312 is analogous to a throttle control of a motor. A p-state 312 of 100% represents a maximum performance state of a core while a p-state of 50% represents a core at half of the maximum frequency with a corresponding reduced core voltage level. It should be noted that the actual power consumption of a core may not coincide or be proportional with the p-state 312. For example, doubling the p-state 312 of a core may not double the power consumption of the core because of other factors, such as core power leakage, core base power consumption, and/or other factors. In some embodiments, the kernel power manager 114 may determine and/or control the p-state 312, such as by referencing the power policy.

Each core includes an output utilization value ("output utility") 314 that represents the workload of the core in relation to the total workload capacity. For example, the output utility 314 may have a scale of 0-10,000 where 0 represents no utilization and 10,000 represents maximum utilization. The output utility 314 may be calculated by multiplying the core utility 310 and the p-state 312. For example, the core 0 302 includes a core utility of 80% and a p-state of 80%, therefore the output utility is 6,400. In some embodiments, the output utility 314 is used by the kernel power manager 114 to determine core parking decisions and/or determine p-state 312 settings, such as with reference to the power policy.

In some embodiments, the system 300 may include a core block 316, such as a first core block 316(1) and a second core block 316(2), however more or fewer core blocks may be implemented in the system 300. The core block 316 may represent a platform having multiple cores with a single circuit, such as a dual-core or multi-core processor. Each core block 316 may include unique power consumption characteristics. For example, a core may include active level power consumption, core leakage, or other power dissipations which occur when either of the cores in the block is unparked. For example, if both cores in the first core block 316(1) are unparked and have the output utility of 10,000, the combined power consumption may be 2x watts. If the core 0 302 in the first core block 316(1) is subsequently parked (e.g., output utilization is 0) and the core 1 304 remains unchanged, the combined power consumption may be greater than x watts because of factors associated with the core block 316 such as power leakage, active power consumption, and/or other factors. When the core 1 is subsequently parked, the resultant power consumption may be 0 watts. Therefore, it may be advantageous to park cores such that entire core blocks become parked before other cores are subsequently parked, thus maximizing power savings.

As shown in FIG. 3A, an illustrative implementation of the system 300 includes the core 3 308 being parked while the other cores are unparked (i.e., active). Although core 3 includes a p-state of 100%, this may not indicate that power is supplied to the core 3. Stated another way, the kernel power manager 114 may park a core while leaving a p-state at a level greater than 0%.

In an example utilization scenario, the kernel power manager 114 may calculate the output of system 300 to determine a total system utility of 12,600 (i.e., 6,400+3,200+3,000=12,600) of a maximum total system utility of 30,000 (i.e., 3 unparked cores×10,000=30,000). The utilization numbers referenced above are intended to be explanatory in nature of calculations that may be performed using the total system utility, and thus are not limiting to the disclosure.

FIG. 3B shows an illustrative revision of the core utilizations in a revised system 318 in response to the total system utilization as shown in FIG. 3A. The revise system 318 includes a revision in the parked/unparked status of the cores 302, 304, 306, and 308. As noted above, with reference to the system 300, the total system utility was calculated to be 12,600 in an example. Therefore, the kernel power manager 114 may park an additional core without reducing the ability of the system to meet the current workload demands because the total system utility is less than the maximum utilization capacity of two cores (i.e., 12,600<20,000). In accordance with some embodiments, the kernel power manager 114 may select a core to park, perhaps based on the power policy or other factors, which may be completely transparent to a user of the system. The user transparency includes no user perceivable system or application performance impact except for its principle goal of better power efficiency. Any changes required to implement core parking may be constrained to very low level operation system internal components, and accordingly there may be no behavioral or experiential change for end users associated with core parking.

When a second core is parked, the maximum total system utility of the revised system will drop to 20,000 (2 cores×10,000). The kernel power manager 114 may park any of the cores which were active in the previous state (as shown in FIG. 3A). As discussed above, it may be advantageous to park core 2 306 to completely park the second core block 316(2), resulting in a parked core block 320. Accordingly, the parked core block 320 may increase power saving as compared to parking the core 0 302 or the core 1 304 instead of the core 2 306.

In order to accommodate a transparent change to any users of the system 318, the output utility of the parked core (core 2) must be absorbed or reallocated to the remaining unparked cores (i.e., core 0 and core 1). From FIG. 3A, the output utility of core 2 was 3,000. Therefore, in one instance, the unparked cores may equally share the burden by having each core have a modified output utility 322 that assumes an additional output utility of 1,500 for each core. In some instances, other divisions of a parked core's total utility may be used when allocating the utility to unparked cores. For example, an unparked core may be running near capacity (total utility near 10,000, which is the maximum utility). In such an instance, cores with greater bandwidth may absorb more of the parked core's total utility.

In one or more embodiments, the kernel power manager 114 may adjust the core utility 310 of the core 0 302 and the core 1 304 to 79% and 47%, respectively. In addition, the kernel power manager 114 may increase the p-state 312 to 100% for both of the unparked cores. Therefore, the total system utility of the revised system 318 remains equal to the total system utility of the system 300 at 12,600.

The revised system 318 illustrates one possible revision of the parked/unparked status, the core utility 310, and/or the p-state 312 to accommodate a core revision that is transparent to users while resulting in reduced power consumption for the revised system 318. However, many other revisions may be made in system 318 which result in reduced power consumption and that are transparent to users. For example, the core utility 310 of core 1 304 may be increase to 94% while the p-state is reduced to 50%, resulting in a total utility of 4700. The revision strategy may be determined by the power policy which may take into account the competing interests of the kernel power manager 114 and the kernel scheduler 116.

Other considerations may be implemented in the power policy that may affect the revised system 318. For example, threads that are not time sensitive (e.g., background threads) may have less impact on the core parking decision while keeping changes transparent to the users. More specifically, by including the distribution of average runtimes across thread priorities executed on a given core, the kernel power manager 114 may scale a core's calculated utilization such that low priority threads and workloads do not count as much as high priority threads and workloads.

Figure 4:
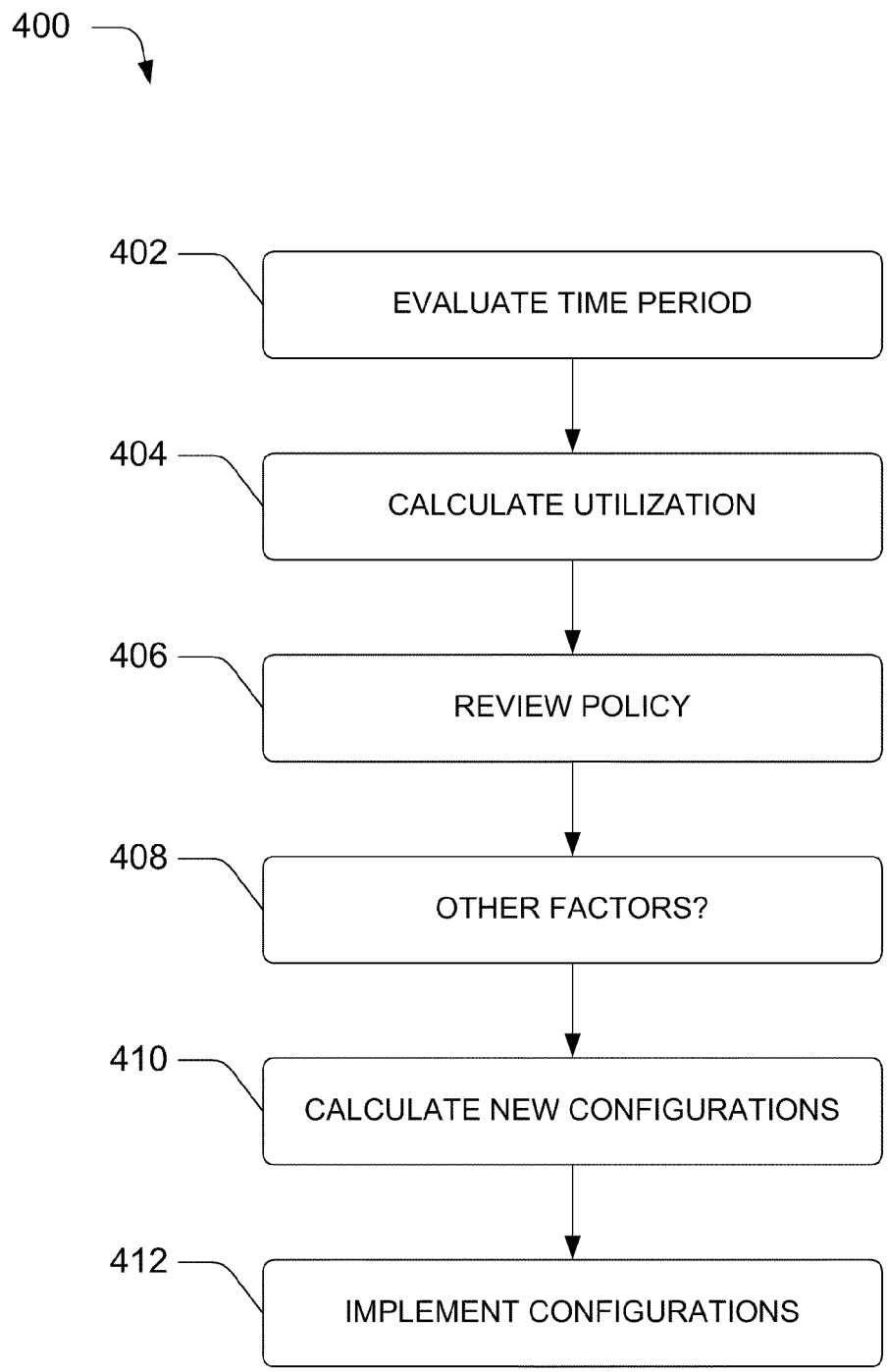
FIG. 4 shows a flow diagram of at least one embodiment of an illustrative process of evaluating thread scheduling and dynamic use of processors and determining a revised configuration for the processors.

FIG. 4 shows a flow diagram of at least one embodiment of an illustrative process 400 of evaluating thread scheduling and dynamic use of processors and determining a revised configuration for the processors. The process 400 may be implemented by the kernel power manager 114 in addition to other modules in the operating system 108 and/or residing on the system memory 106.

In accordance with one or more embodiments, the kernel power manager 114 evaluates a time period for monitoring the output utility 314 (among other factors including the core utility 310, the p-state 312, etc.). The time period may be selected that is equal to, or longer than, a time slice available for processing each thread. At a given frequency, the kernel power manager 114 may initiate the monitoring of the cores.

At 404, the kernel power manager 114 may calculate the total system utilization and the maximum total system utilization. The kernel power manager 114 may review the power policy at 406 to determine how to adjust the core usage to balance the power savings needs of the kernel power manager 114 and the core availability (processing performance) needs of the kernel scheduler 116. At 408, other factors may be used to determine whether to adjust the core usage, and if so, how to adjust the usage to achieve system goals such as a transparent change for the users, accommodate thermo requirements, and/or accommodate other constraints.

At 410, the kernel power manager 114 may calculate new configurations for the cores. For example, the kernel power manager may calculate a new bit mask 202 as shown in FIG. 2. In one or more embodiments, the bit mask may be adjusted to create the available processor set 218 at 410. At 412, the kernel power manager 114 may implement the configurations from 410. In some embodiments, the process 400 may repeat to create a dynamic core allocation, such as by repeating at a predetermined frequency. Alternatively, the process 400 may create a static core allocation over a given period of time.

Illustrative Operation

Figure 5:
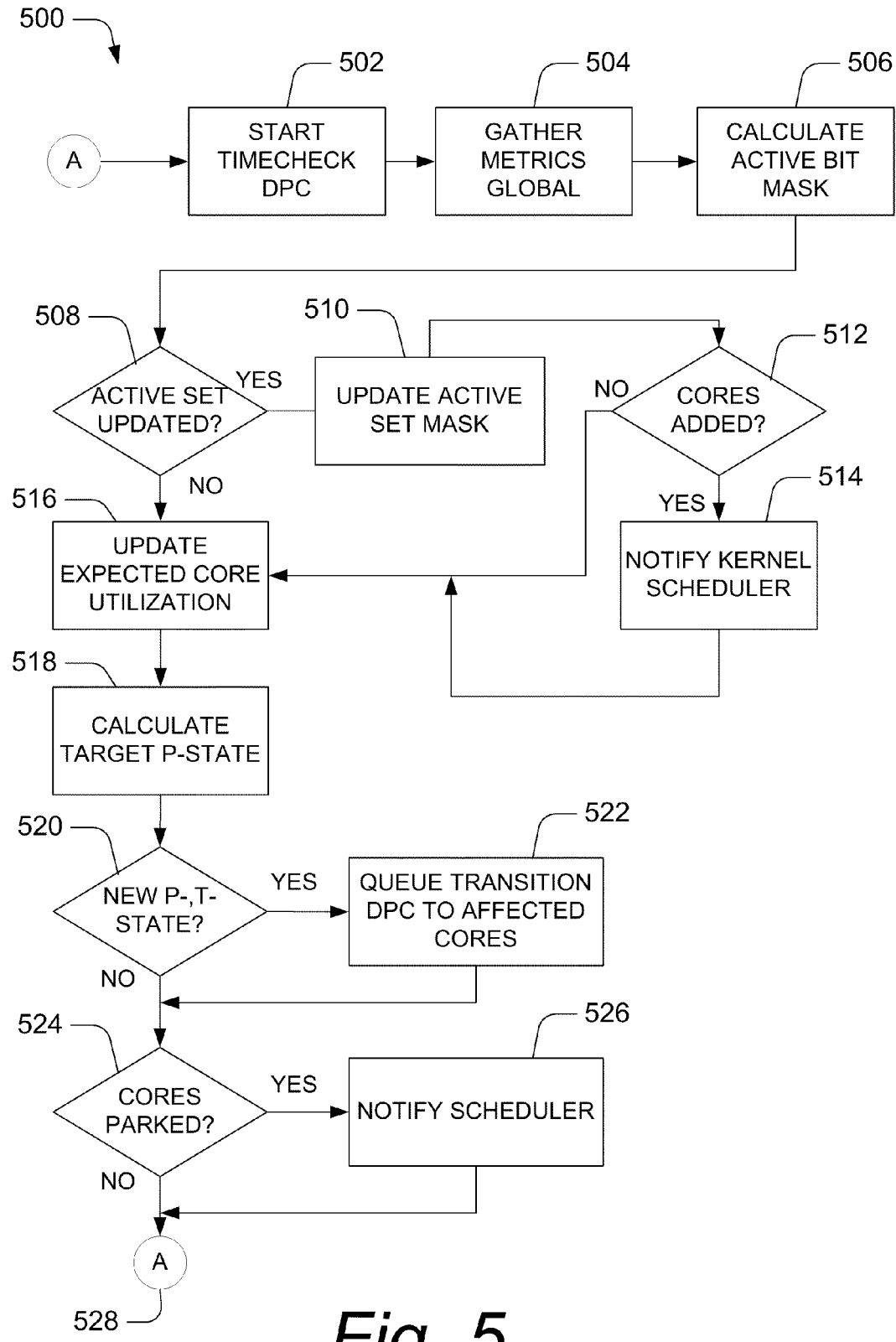
FIG. 5 shows a flow diagram of at least one embodiment of an illustrative process of providing power-aware thread scheduling and dynamic use of processors.

FIG. 5 shows a flow diagram of at least one embodiment of an illustrative process 500 of providing power-aware thread scheduling and dynamic use of processors. The process 500 shall be construed similarly as the process 200 of FIG. 2 regarding ordering and implementation of the process. For example, the order in which the operations in the process 500 are described is not intended to be construed as a limitation, and any number of the described blocks can be combined in any order and/or in parallel to implement the process. For discussion purposes, the process 500 is described with reference to the system 100 of FIG. 1.

In accordance with one or more embodiments, a "TimeCheck" periodic evaluation routine may begin at 502. For example, a deferred procedure call (DPC) may begin at 502. In some embodiments, a state machine is entered on each core via the DPC running at a fixed periodic rate configured by a power policy parameter "TimeCheck" for a time value, such as 100 ms, 50 ms, or another time value. At 504, the kernel power manager 114 may gather metrics for the cores. For example, the DPC is queued to each currently active core to snap metrics for the active cores. The metrics may include core utilization, thread priority distribution, an average wait time for ready threads for each core, and/or success and failure metrics for idle state residency, among other possible metrics.

At 506, the kernel power manager 114 may calculate a bit mask, such as the core parking mask 204. For example, a new value may be calculated for the target number of active cores based on utilization thresholds, the power policy, and/or any dependency relationships. At 508, an active set may be updated, such as by implementing portions of the process 200 governed by the kernel power manager 114 to create the available processor set 218.

At 510, the active set may be implemented by the operating system 108. The kernel power manager 114 may determine if cores have been added (unparked) at 512. If cores are unparked, the kernel scheduler 116 may be notified at 514 and may begin using the unparked cores to schedule threads. These unparked cores can either be the target of remote thread scheduling (i.e., from a different processor), or can proactively choose to select threads from other processors. In some embodiments, threads may be reassigned to run on the unparked cores, thereby reducing workload from other unparked cores.

At 516, the expected core output utilization may be calculated by the kernel power manager 114 and may include unparked cores from 506. Thus, a new value for the number of active cores determined at 506 is used to calculate expected processor utilization. At 518, the kernel power manager 114 may calculate a new value for the p-state. In some embodiments, a DPC is scheduled on each core to update its target p-state. In an example, if the expected utilization increases, the p-state value may also increase if no cores are unparked at 512. However, if cores are unparked at 512, the p-state may increase or decrease to balance power savings needs of the kernel power manager 114 with processing needs of the kernel scheduler 116.

At 520, the kernel power manager 114 determines if the p-state and/or t-state (linear throttle state) current values should be revised based on the results from the calculation at 518. If the p-state and/or t-state are modified at 520, the kernel power manager 114 may queue transition DPC's to the affected cores at 522. Thus, the threads scheduled by the kernel scheduler 116 may be scheduled to cores running at the new p-state and/or t-state as implemented at 520.

At 524, the kernel power manager 114 determines if cores have been parked in 506. For example, the expected core output utilization from 516 may be less than the current utilization. If cores have been parked at 524, the kernel power manager 114 may notify the kernel scheduler 116 at 526 to terminate scheduling of threads to the newly parked cores. For any cores added or removed to the active core mask, a DPC is scheduled for that core. As described with reference to FIGS. 3A and 3B, the work from a parked core may be reallocated to one or more unparked cores. In some embodiments, newly parked cores may be placed into the deepest c-state that is available. Finally, at 528 the process 500 may be repeated.

Figure 6:
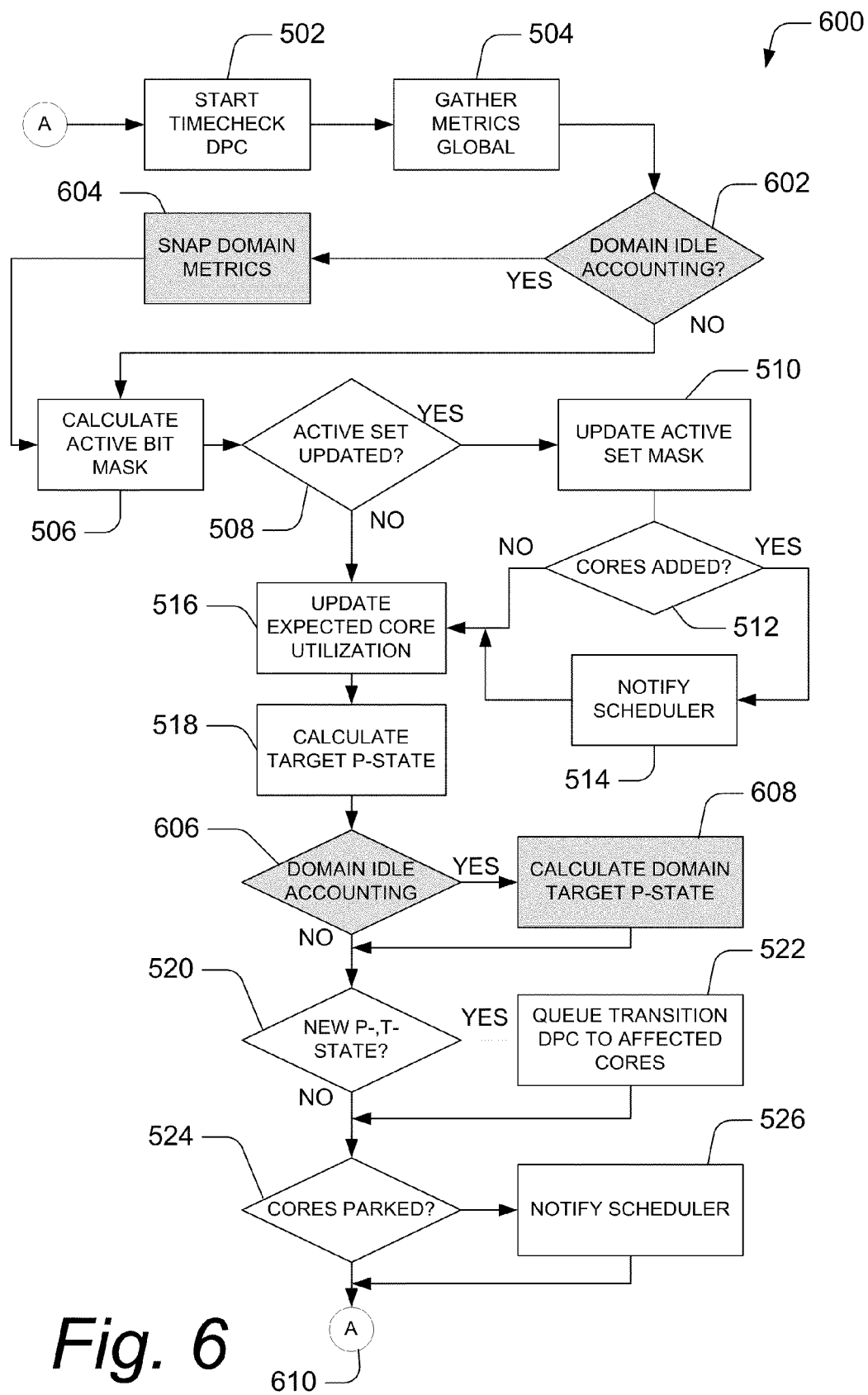
FIG. 6 shows another flow diagram of at least one embodiment of an illustrative process of providing power-aware thread scheduling and dynamic use of processors, further including domain idle accounting.

FIG. 6 shows another flow diagram of at least one embodiment of an illustrative process 600 of providing power-aware thread scheduling and dynamic use of processors, further including domain idle accounting. The process 600 includes many of the sub-processes as described in FIG. 5, and therefore those sub-processes from FIG. 5 will not be described again.

At 602, the kernel power manager 114 may determine whether domain idle accounting is enabled. If domain idle accounting is enabled, a domain master snaps metrics for the domain (e.g., the core block 316 or all cores) at 604.

In some embodiments, the domain idle accounting may initiate another decision at 606. If domain idle accounting is enabled, the kernel power manager 114 may calculate the domain target p-state at 608. Finally, at 610 the process 600 may be repeated.

Figure 7:
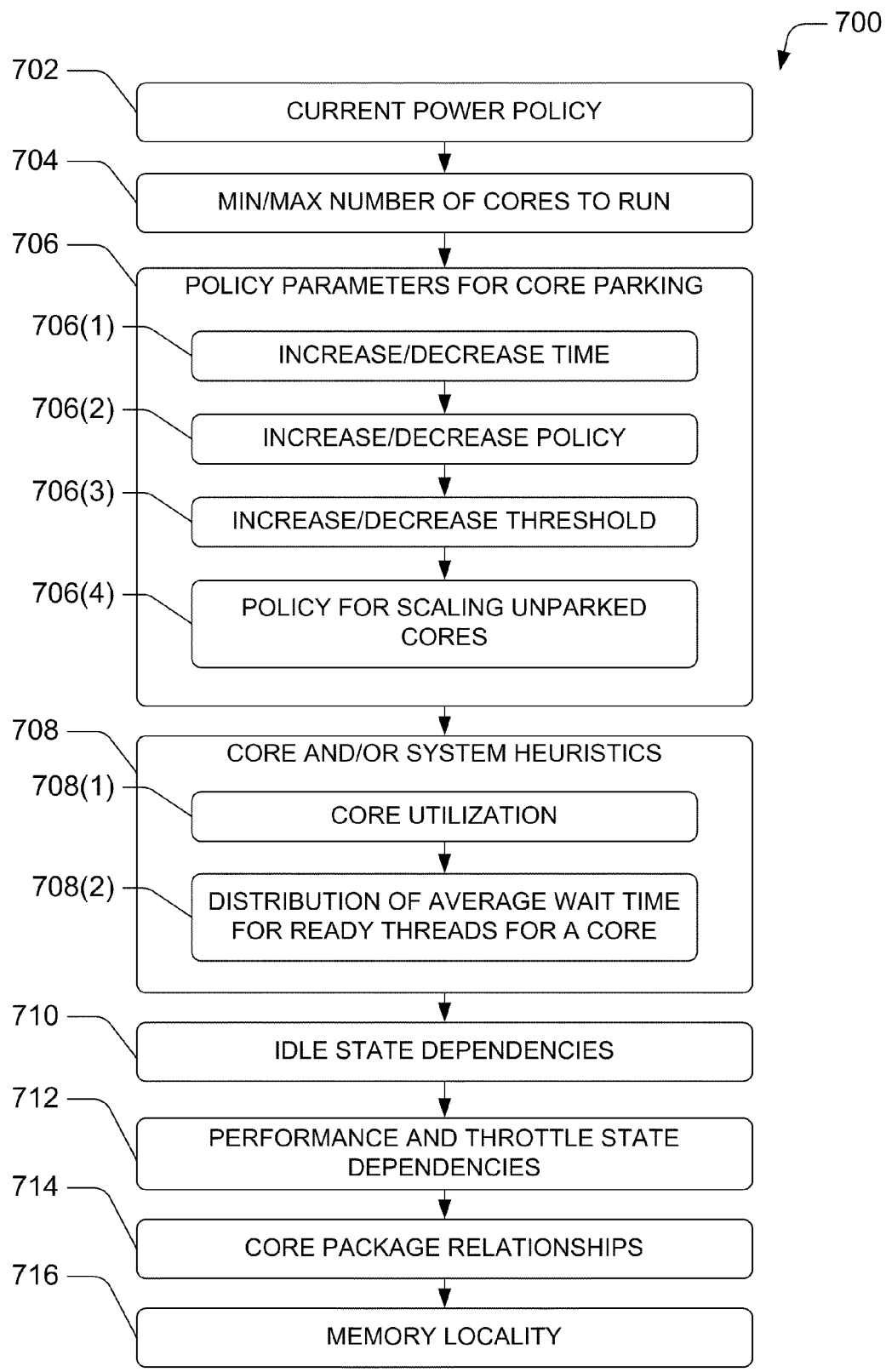
FIG. 7 shows an illustrative flow diagram of at least one embodiment of providing additional settings for power-aware thread scheduling and dynamic use of processors.

FIG. 7 shows a flow diagram of at least one embodiment of a process 700 of providing additional power policy settings and other inputs for power-aware thread scheduling and dynamic use of processors. In some embodiments, core parking may be implemented as an enhancement to the existing state machine that calculates the target state to be used for processor performance states. The correct number of cores to be used at any given time will be determined based a number of factors as described below with reference to the process 700.

In accordance with one or more embodiments, the current power policy may be used to set the number of cores to be utilized at 702. At 704, the minimum or maximum number of cores may be set. The kernel power manager 114 may calculate the number of active cores required to complete a given workload in an energy efficient manner. In some instances, running the minimum number of cores may be beneficial to the power savings and benefit the kernel power manager 114. Conversely, running the maximum number of cores may provide the highest level of performance, thus benefiting the kernel scheduler 116.

At 706, additional power policy parameters for core parking may be implemented by the kernel power manager 114, using one or more of sub-processes 706(1), . . . , 706(4). At 706(1), the required time interval for parking and/or unparking cores may be adjusted. For example, the frequency of parking and/or unparking cores may be manipulated by changing an interval. In some embodiments, cores may be parked at a first interval and unparked at a second interval. For example, a policy favoring power savings may park cores as frequently as every 100 ms, but may only unpark cores every 500 ms.

At 706(2), the kernel power manager 114 may implement an increase and/or decrease policy. For example, a first policy option may only park a set number of cores at a time, such as one core at a time. A second policy option may park or unpark cores to achieve ideal core utilization, thus parking and/or unparking multiple cores at a time. A third policy may go to one extreme or the other (either park as many as possible or unpark as many as possible).

At 706(3), the required utilization threshold may be increased or decreased based on the busyness of the processors. For example, a processor may not undergo a change in a status of parked or unparked until the processor (or other processors) include a state of busyness for a given period of time. This may reduce a processor from flipping between a parked and unparked state in a rapid succession.

Finally, at 706(4), the policy for scaling unparked cores may be implemented. For example, the kernel power manager 114 may calculate the ideal target processor performance state based on the number of processor cores in the currently active set. To provide the best tradeoffs between power savings, performance, and responsiveness to specific workloads, the kernel power manager 114 may advantageously run a smaller number of processors in a higher performance state, or conversely, run a larger number of cores in a lower performance state.

At 708, core and or system heuristics may be implemented by the kernel power manager 114, using one or more of sub-processes 708(1) and 708(2). At 708(1), the kernel power manager 114 may calculate the number of active cores required and the optimal performance state of the cores in active use based on the successful use of deep processor idle power states (sleep states). This may allow the kernel power manager to detect when the deeper idle states are not being efficiently used across the set of active (unparked) cores. To conserve power and still provide performance, it may be beneficial to place more cores into the parked state, and increase the performance state of the remaining active cores to ensure work gets executed efficiently.

At 708(2), an average wait time may be used for threads ready to be allocated (assigned) to a core. For example, the kernel power manager 114 may calculate the number of processor cores required by using the distribution of average wait times for threads in the ready state, which allows the kernel power manager to scale the number of cores in use to reduce the latency before threads in the ready state are able to run, thus increasing performance and responsiveness. In an example, when a large number of threads need to be run, it may be advantageous to unpark cores while reducing the p-state of cores because each core can only process one thread at a time. Thus, more core availability will enable processing the large number of threads in some instances.

At 710, idle state dependencies may be used by the kernel power manager 114 to adjust a core parking implementation. When the kernel power manager 114 selects which specific cores should be parked or unparked, it will first examine the idle state dependency relationships of cores to determine which cores might share power or clock resources, and choose to park or unpark cores in the most power efficient manner based on shared controls.

At 712, performance and throttle state relationships may be considered when determining whether to park or unpark one or more cores. Cores that share performance state or throttling controls may be parked or unparked together to realize greater power efficiencies.

At 714, the core package (block) relationships may be considered, such as dependencies described in FIGS. 3A and 3B regarding the efficiencies of a core block, and more specifically parking a core block before parking another core in a new core block. Finally, at 716, memory locality may be used by the kernel power manager 114 when implementing core parking considerations. For example, two or more cores may have package relationships such as the cores sharing a physical processor package having a shared memory bank (e.g., NUMA (non-uniform memory access) node). The shared memory bank may enable the cores to have reduced memory access time as compared to cores that do not share the shared memory bank

CONCLUSION

The above-described techniques, systems, and apparatuses pertain to providing power-aware thread scheduling and dynamic use of processors. Although the techniques, systems, and apparatuses have been described in language specific to structural features and/or methodological acts, it is to be understood that the appended claims are not necessarily limited to the specific features or acts described. Rather, the specific features and acts are disclosed as exemplary forms of implementing such techniques and apparatuses.

What is claimed is:

1. A method for balancing performance and power savings of a computing device having multiple cores, comprising:
   determining which cores of the multiple cores are actively processing work;
   determining a power policy to initiate a performance and power savings plan for the multiple cores, wherein determining the power policy comprises calculating which cores are designated as parked or unparked based at least in part on an available processor set and on a distribution of the multiple cores over multiple core blocks; and
   parking at least one of the cores actively processing work based at least in part on the power policy indicating that the one of the cores actively processing work is designated as a parked core.

2. The method of claim 1, wherein the determining the power policy occurs dynamically as an iterative process.

3. The method of claim 1, further comprising scaling at least one of the multiple cores based on the power policy.

4. The method of claim 3, wherein the scaling the at least one of the multiple cores includes adjusting at least one of a core utility or a power state (p-state) of a core to increase power savings.

5. The method of claim 1, wherein the parking at least one of the multiple cores includes:
   determining if an unparked core block of the multiple core blocks includes a parked core; and
   if the unparked core block is determined to have the parked core, parking at least one unparked core in the unparked core block before parking a different unparked core in a different core block of the multiple core blocks.

6. The method of claim 1, further comprising modifying the power policy using at least one of:
   core and system heuristics;
   processor dependency relationship; and
   core policy parameters for core parking.

7. The method of claim 1, further comprising modifying the power policy using processor idle state dependency relationships of cores.

8. The method of claim 1, wherein determining the power policy comprises providing at least a portion of the performance and power savings plan for the cores by combining a core parking mask and a thread processor affinity mask.

9. One or more computer storage memories comprising computer-executable instructions that, when executed by a computer, perform acts comprising:
   monitoring core activity in a multi-core system;
   retrieving a power policy for the multi-core system, the power policy balancing power savings and processing performance of individual cores in the multi-core system;
   unparking at least one core of multiple cores based at least partly on the core activity and the power policy;
   reassigning at least one thread of a plurality of threads to the at least one unparked core; and
   causing the at least one thread to be executed on the at least one unparked core in addition to causing one or more additional threads of the plurality of threads to be executed on one or more previously unparked cores of the multiple cores.

10. One or more computer storage memories as in claim 9, wherein the acts further comprise adjusting the power state of one or more previously unparked cores of the previously unparked cores.

11. One or more computer storage memories as in claim 9, wherein the unparking the least one core based at least partly on the core activity is dynamically initiated at a predetermined frequency.

12. One or more computer storage memories as in claim 9, wherein the acts further comprise monitoring the core activity in the multi-core system for a predetermined time period.

13. One or more computer storage memories as in claim 9, wherein the unparking the at least one core comprises unparking a core of the multiple cores in a core block that includes at least one other unparked core, wherein the core block has a level of power dissipation when any of the cores in the core block are unparked.

14. One or more computer storage memories as in claim 9, wherein the acts further comprise parking at least one other core of the multiple cores in response to the core activity based on the power policy.

15. A multiple logical processor system, comprising:
   a plurality of processors, wherein the plurality of processors include at least one core block having multiple cores; and
   a controller coupled to the plurality of processors, the controller to:
   implement a performance schedule;
   implement a power savings policy;
   balance the performance schedule and the power savings policy by parking one or more cores of the multiple cores; and reassign two or more threads from the parked one or more cores to two or more unparked cores of the multiple cores.

16. The system of claim 15, wherein the controller receives instructions from a kernel power manager residing in system memory to implement the power savings policy.

17. The system of claim 15, wherein the controller adjusts a p-state of at least one unparked core.

18. The system of claim 15, wherein the power savings policy restricts a number of cores to be used and expresses the number of cores to be used as a percentage of maximum core utilization.

19. The system of claim 15, wherein the power savings policy includes a core parking mask, the core parking mask and one or more program module schedules to determine a resulting set of processors on which to schedule work.

20. The system of claim 15, wherein the balancing the performance schedule and the power savings policy further comprises creating a core parking prioritization for an unparked core in a core block having at least one parked core.

* * * * *